United States Patent
Li

(10) Patent No.: US 7,318,022 B2
(45) Date of Patent: Jan. 8, 2008

(54) METHOD AND APPARATUS FOR TRAINING A TRANSLATION DISAMBIGUATION CLASSIFIER

(75) Inventor: Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 10/459,816

(22) Filed: Jun. 12, 2003

(65) Prior Publication Data

US 2004/0254782 A1 Dec. 16, 2004

(51) Int. Cl.
*G06F 17/21* (2006.01)
*G06F 17/20* (2006.01)
*G06F 17/28* (2006.01)

(52) U.S. Cl. ................. 704/10; 704/2; 704/8
(58) Field of Classification Search .......... 704/2, 704/8, 9, 10
See application file for complete search history.

(56) References Cited

U.S. PATENT DOCUMENTS

| | | | | |
|---|---|---|---|---|
| 5,477,451 A * | 12/1995 | Brown et al. | ................. | 704/9 |
| 5,687,383 A * | 11/1997 | Nakayama et al. | ............ | 704/2 |
| 5,742,926 A * | 4/1998 | Yumura et al. | ................ | 704/2 |
| 5,768,603 A * | 6/1998 | Brown et al. | ................. | 704/9 |
| 5,805,771 A * | 9/1998 | Muthusamy et al. | ........ | 704/232 |
| 5,826,220 A * | 10/1998 | Takeda et al. | ................ | 704/7 |
| 5,873,056 A * | 2/1999 | Liddy et al. | .................. | 704/9 |
| 5,963,902 A * | 10/1999 | Wang | ........................ | 704/243 |
| 5,995,922 A * | 11/1999 | Penteroudakis et al. | ....... | 704/9 |
| 6,161,083 A * | 12/2000 | Franz et al. | .................. | 704/4 |
| 6,188,976 B1 * | 2/2001 | Ramaswamy et al. | ......... | 704/9 |
| 6,253,170 B1 * | 6/2001 | Dolan | ........................ | 704/10 |
| 6,260,008 B1 * | 7/2001 | Sanfilippo | ..................... | 704/9 |
| 6,272,456 B1 * | 8/2001 | de Campos | .................... | 704/8 |
| 6,292,767 B1 * | 9/2001 | Jackson et al. | ............... | 704/1 |
| 6,393,388 B1 * | 5/2002 | Franz et al. | .................. | 704/4 |
| 6,456,969 B1 * | 9/2002 | Beyerlein | ................... | 704/234 |
| 6,631,346 B1 * | 10/2003 | Karaorman et al. | ........... | 704/9 |
| 6,640,207 B2 * | 10/2003 | Witschel | ........................ | 704/9 |
| 7,016,829 B2 * | 3/2006 | Brill et al. | .................... | 704/9 |
| 7,031,911 B2 * | 4/2006 | Zhou et al. | ................... | 704/10 |
| 2003/0023422 A1 * | 1/2003 | Menezes et al. | ............... | 704/2 |
| 2003/0154181 A1 * | 8/2003 | Liu et al. | ....................... | 707/1 |
| 2004/0030551 A1 * | 2/2004 | Marcu et al. | ............... | 704/240 |

OTHER PUBLICATIONS

Cong Li, "Word Translation Disambiguation Using Bilingual Bootstrapping," In Proceedings of the 40th Annual Meeting of the Association for Comutational Linguistics (ACL), Philadelphia, Jul. 2002, pp. 343-351.*

(Continued)

*Primary Examiner*—Patrick N. Edouard
*Assistant Examiner*—Douglas C Godbold
(74) *Attorney, Agent, or Firm*—Theodore M. Magee; Westman, Champlin & Kelly, P.A.

(57) ABSTRACT

A method of training a classifier includes applying a first classifier to a first set of unlabeled data to form a first set of labeled data. The first classifier is able to assign data to classes in a first set of classes. A second classifier is applied to a second set of unlabeled data to from a second set of labeled data. The second classifier is able to assign data to classes in a second set of classes that is different from the first set of classes. The first and second sets of labeled data are used to retrain the first classifier.

29 Claims, 6 Drawing Sheets

OTHER PUBLICATIONS

A. Blum and T. Mitchell, "Combining Labeled and Unlabeled Data With Co-Training," In Proceedings of the 11th Annual Conference on Computational Learning Theory, pp. 92-100 (1998).

M. Collins and Y. Singer, "Unsupervised Models for Named Entity Classification," In Proceedings of the 1999 Joint SIGDAT Conference on Empirical Methods in Natural Language Processing and Very Large Corpora. (1999).

I. Dagan and A. Itai, "Word Sense Disambiguation Using a Second Language Monolingual Corpus.," Computational Linguistics, vol. 20, pp. 563-596 (1994).

P. Koehn and K. Knight, "Estimating Word Translation Probabilities from Unrelated Monolingual Corpora Using the EM Algorithm,"In Proceedings of the 17th National Conference on Artificial Intelligence, pp. 711-715 (2000).

A.R. Golding and D. Roth, "Applying Winnow to Context-Sensitive Spelling Correction," 13th International Conference on Machine Learning, pp. 182-190 (Jul. 1996).

T. Pedersen and R. Bruce, "Distinguishing Word Senses in Untagged Text," In Proceedings of the 2nd Conference on Empirical Methods in Natural Language Processing, pp. 197-207 (1997).

D. Yarowsky, "Decision Lists for Lexical Ambiguity Resolution: Application to Accent Restoration in Spanish and French," In Proceedings of the 32nd Annual Meeting of the Association for Computational Linguistics, pp. 88-95 (1994).

D. Yarowsky, "Unsupervised Word Sense Disambiguation Rivaling Supervised Methods," In Proceedings of the 33rd Annual Meeting of the Association for Computational Linguistics, pp. 189-196 (1995).

* cited by examiner

METHOD AND APPARATUS FOR TRAINING A TRANSLATION DISAMBIGUATION CLASSIFIER

BACKGROUND OF THE INVENTION

The present invention relates to automatic translation systems. In particular, the present invention relates to resolving ambiguities in translations.

In translation systems, a string of characters in one language is converted into a string of characters in another language. One challenge to such translation systems is that a word in one language can have multiple possible translations in the other language depending on the sense of the word. For example, in English, the word "plant" can either be translated to the Chinese word "gongchang" which corresponds to the sense of "factory" or to "zhiwu" which corresponds to the sense of "vegetation".

Under the prior art, this problem has been viewed as one of classification in that the word in one language must be classified to a particular sense before it can be translated into the other language. Such classifiers typically operate by examining the context in which the word is found and applying this context to a set of probability models that provide the likelihood that a word will have a particular sense given a particular context.

Such classifiers are typically trained on hand-labeled data that identifies the sense for an ambiguous word in the text. Hand labeling data is expensive because it requires a significant amount of labor. To solve this problem, one system of the prior art developed by Yarowsky used a bootstrapping method that iterates between training a classifier using labeled data and using the classifier to label data. Under this method, a small set of data is first labeled by an expert. This labeled data is then used to build an initial classifier. The remaining unlabeled data in the corpus is applied to the classifier to classify the data. Classifications with a high probability are accepted as correct and are added to the set of labeled data. The classifier is then retrained using the updated set of labeled data. Under Yarowsky, this bootstrapping method is performed with data of a single language.

The field of classification extends beyond translation systems and other systems for training classifiers have been developed. One system, known as co-training, was developed by Blum and Mitchell. Under co-training, two classifiers are constructed in parallel, which are used to identify a topic for a web page. One classifier uses text segments from a web page to classify the web page and another classifier uses links to the web page to classify the web page. The topics identified for the web pages by the classifiers are then used to retrain the classifiers. Under Bloom and Mitchell, both types of classifiers are trained for the same sets of classes or topics. Thus, the classes or topics identified for the web pages from the text of the web pages are the same as the classes identified from the links to the web pages.

Although the classification systems described above have been useful, there is continuing need to provide improved classifiers using as little labeled data as possible.

SUMMARY OF THE INVENTION

A method of training a classifier includes applying a first classifier to a first set of unlabeled data to form a first set of labeled data. The first classifier is able to assign data to classes in a first set of classes. A second classifier is applied to a second set of unlabeled data to from a second set of labeled data. The second classifier is able to assign data to classes in a second set of classes that is different from the first set of classes. The first and second sets of labeled data are used to retrain the first classifier.

DETAILED DESCRIPTION OF ILLUSTRATIVE EMBODIMENTS

Figure 1:
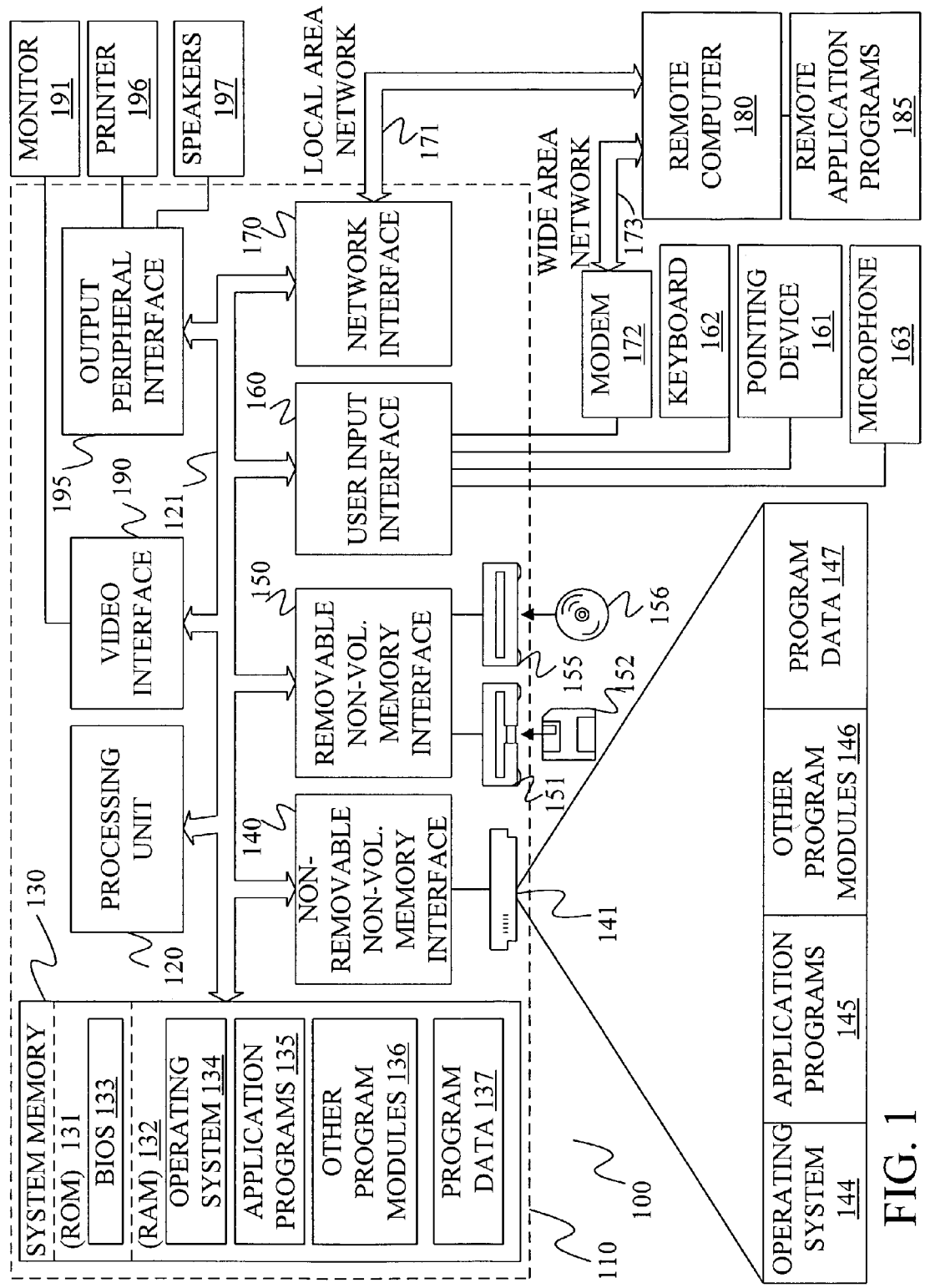
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a method and apparatus for training a classifier for use in disambiguating translations between two languages. In particular, the present invention trains classifiers for both languages and uses the classifiers to label unlabeled data in each language. The labeled data sets are then used to retrain each of the classifiers.

Figure 2:
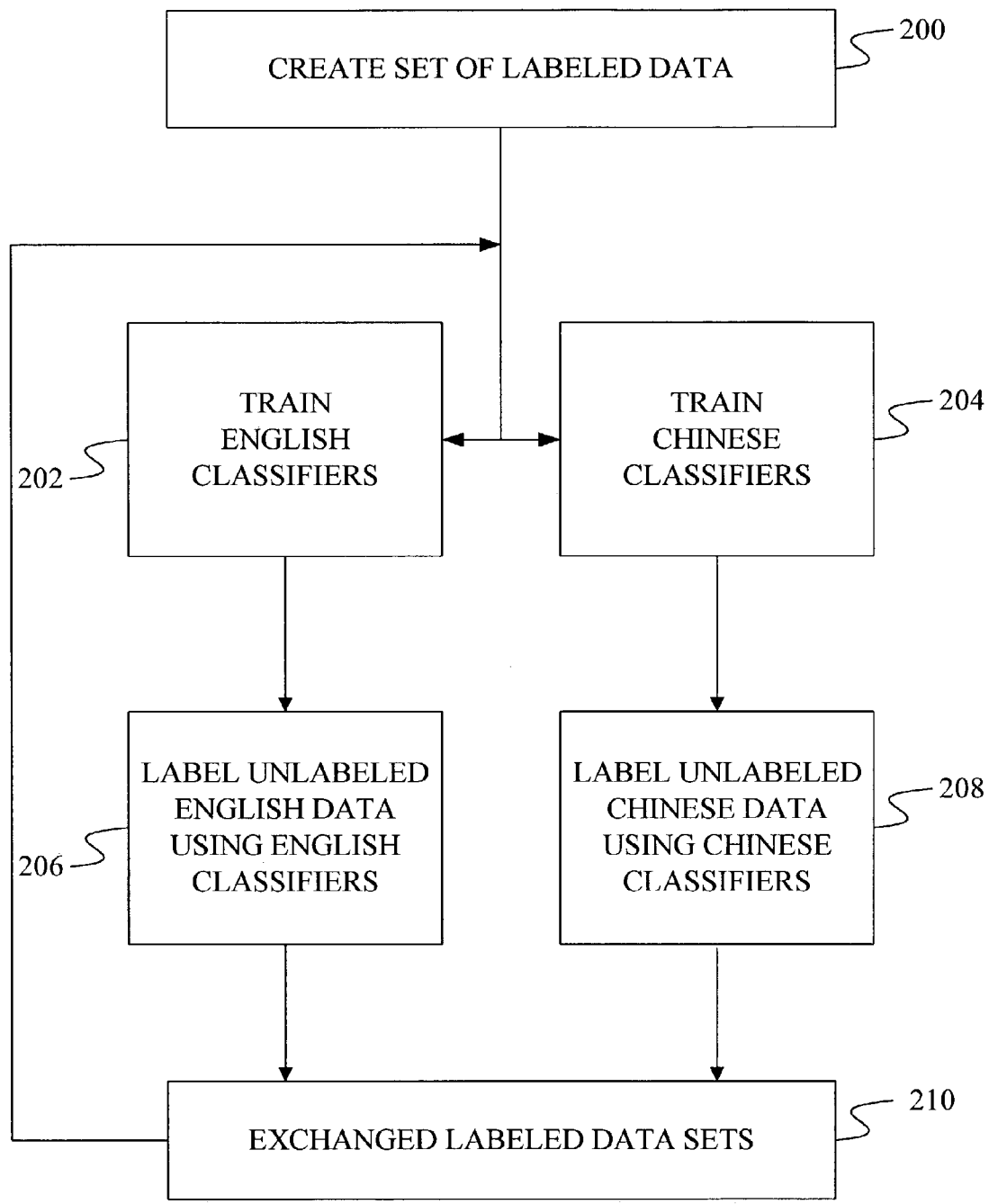
FIG. 2 is a flow diagram of a method of iteratively training a classifier and labeling data under embodiments of the present invention.
Figure 3:
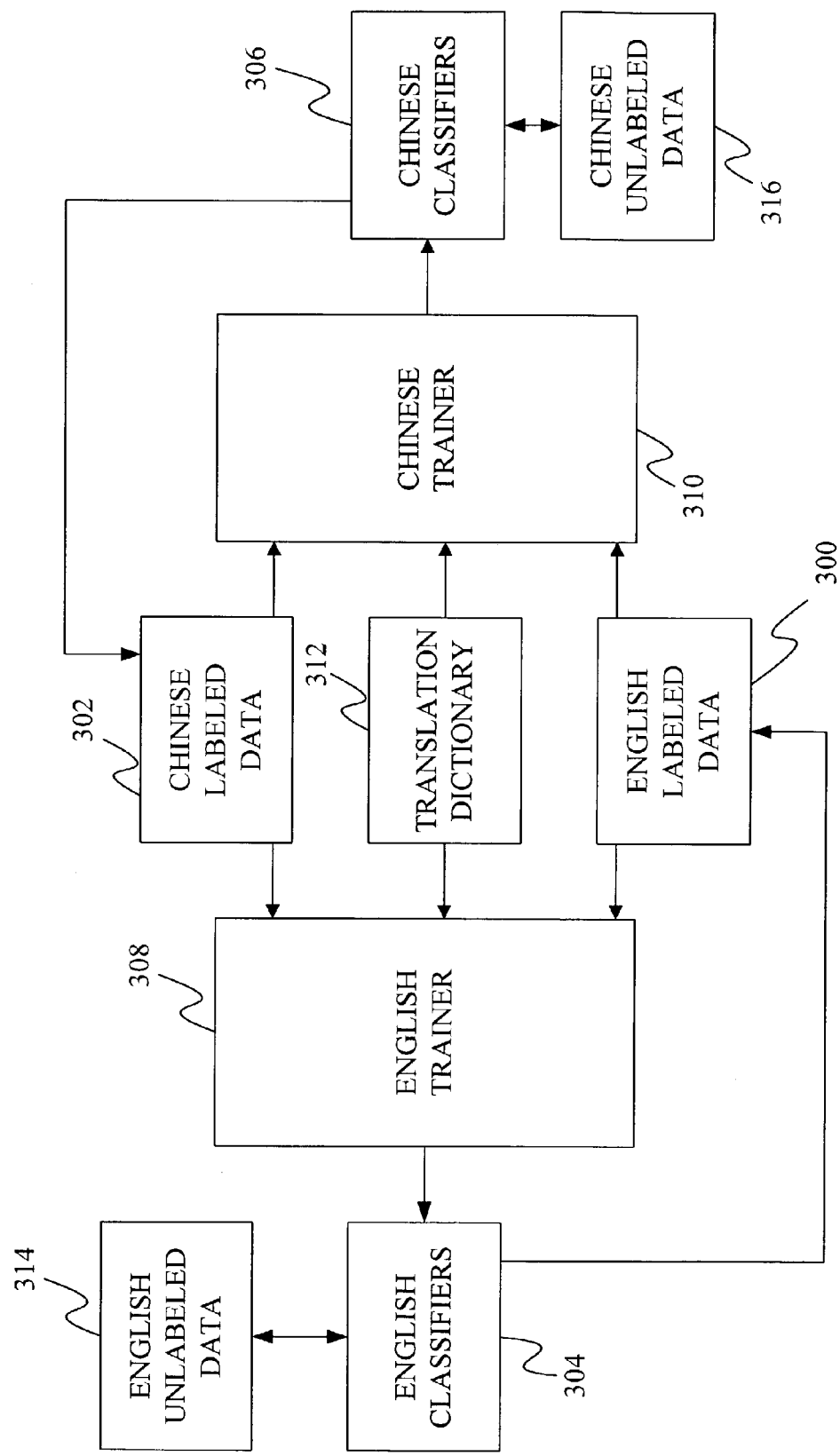
FIG. 3 is a block diagram of a system for training classifiers under embodiments of the present invention.
Figure 5:
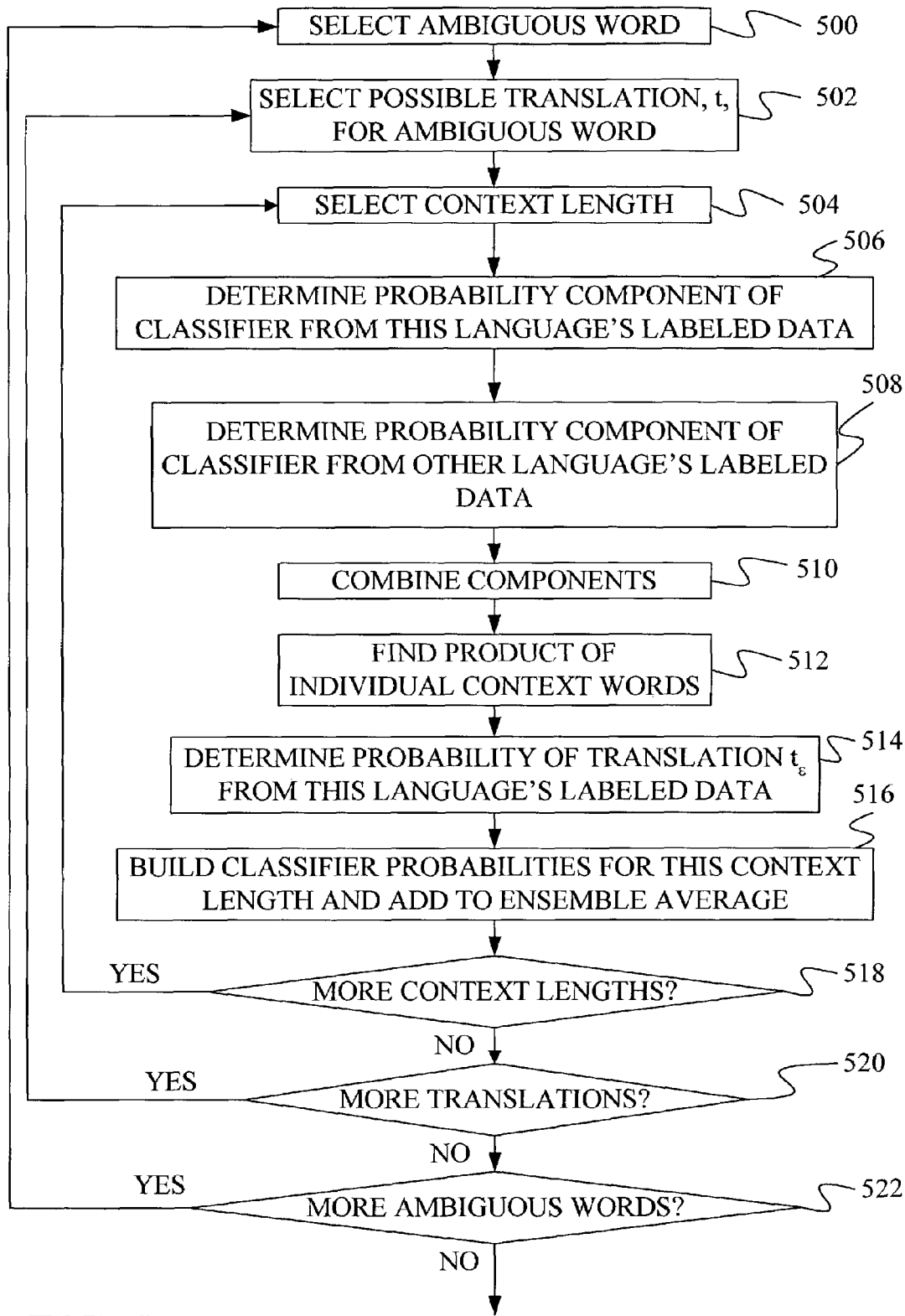
FIG. 5 is a flow diagram of a method training a classifier under embodiments of the present invention.
Figure 6:
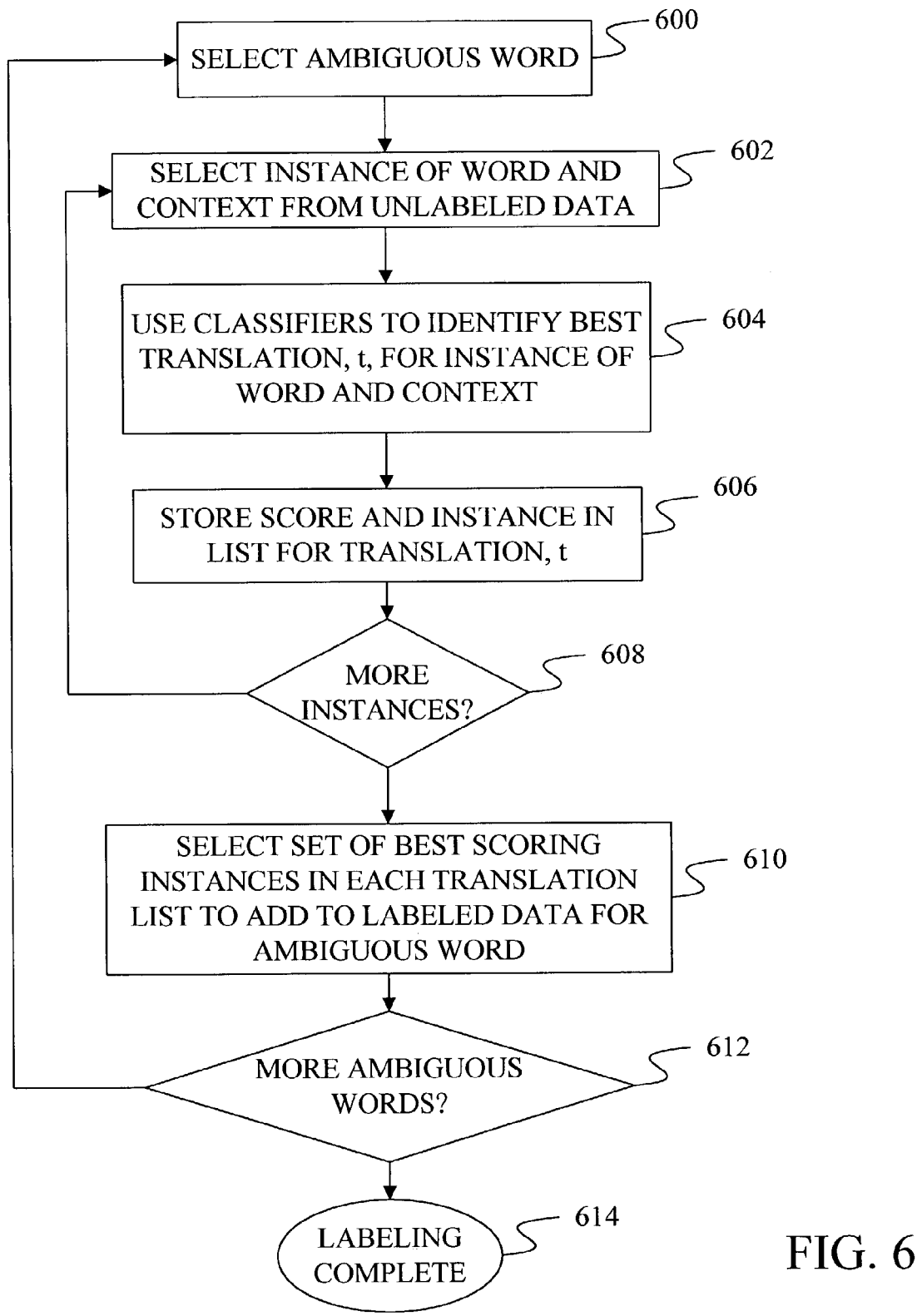
FIG. 6 is a flow diagram of a method of labeling data under embodiments of the present invention.

A method under the present invention for training the classifiers is shown in FIGS. 2, 5 and 6 and the system that is trained is shown in the block diagram of FIG. 3. In these figures, references is made to an English language classifier and a Chinese language classifier, however, the invention is not limited to these two languages and may be used with any pair of languages.

The process begins at step 200 of FIG. 2 where a set of labeled data is created. Under one embodiment, labeled data is initially provided for only one of the languages. In other embodiments, labeled data is provided for both languages. For example, either English labeled data 300 or Chinese labeled data 302 can be provided or both sets of labeled data can be provided at step 200. The labeled data provided at step 200 is small initially and is automatically augmented through the present invention to avoid the expense of hand-labeling a large set of training data. At steps 202 and 204, an English classifier 304 and a Chinese classifier 306, respectively, are trained in parallel with each other by an English trainer 308 and a Chinese trainer 310, respectively. Under one embodiment of the present invention, the classifiers for the two languages are trained using the same algorithm with different sets of data. A technique for training these classifiers under one embodiment of the present invention is shown in more detail in FIG. 5.

The steps of training a classifier involve determining a set of probabilities. The probabilities include the probability for each possible translation of an ambiguous word given the context of the word, as well as the probability that the translation is not a proper translation for the ambiguous word given the context. For example, for an ambiguous English word $\epsilon$, such probabilities for a binary classifier are developed for each translation $t_\epsilon$ in a set of possible translations $T_\epsilon$ given a context $s_\epsilon$ such that:

$$p(t_\epsilon|s_\epsilon), t_\epsilon \in T_\epsilon \quad \text{EQ. 1}$$

$$p(\bar{t}_\epsilon|s_\epsilon), \bar{t}_\epsilon \in T_\epsilon - \{t_\epsilon\} \quad \text{EQ. 2}$$

where $$s_\epsilon = (e_{\epsilon,1}, e_{\epsilon,2}, \ldots e_{\epsilon,m}), e_{\epsilon,i} \in E(i=1,2,\ldots m) \quad \text{EQ. 3}$$

and where E is the set of all possible English words, and $e_{\epsilon,i}$ is an individual context word surrounding the ambiguous word $\epsilon$.

Similarly, for an ambiguous Chinese word $\gamma$, the probabilities for a binary classifier are defined as:

$$p(t_\gamma|s_\gamma), t_\gamma \in T_\gamma \quad \text{EQ. 4}$$

$$p(\bar{t}_\gamma|s_\gamma), \bar{t}_\gamma \in T_\gamma - \{t_\gamma\} \quad \text{EQ. 5}$$

where $$s_\gamma = (c_{\gamma,1}, c_{\gamma,2}, \ldots c_{\gamma,m}), c_{\gamma,i} \in C(i=1,2,\ldots m) \quad \text{EQ. 6}$$

and where $c_{\gamma,i}$ is a context word that surrounds the ambiguous word $\gamma$ and C represents all possible Chinese words.

Note that the sets of possible translations $T_\epsilon$ and $T_\gamma$ are not the same for the two languages. The reason for this is that two words that are translations of each other can have different senses in their respective languages. Thus, for example, the Chinese word "zhiwu", which is a possible translation for "plant" can also be translated as "vegetable". Thus, "plant" and "vegetable" are possible classes for "zhiwu". However, "plant" does not have a translation of "vegetable". Thus, the classes for plant are different than the classes for "zhiwu".

Thus, the classifiers for Chinese attempt to classify an instance $s_\gamma$ of a Chinese word $\gamma$ into one set of classes or translations and the classifiers for English attempt to classify an instance $s_\epsilon$ of an English word $\epsilon$ into a different set of classes or translations. As a result, the two classifiers are not trained on the same set of classes.

Figure 4:
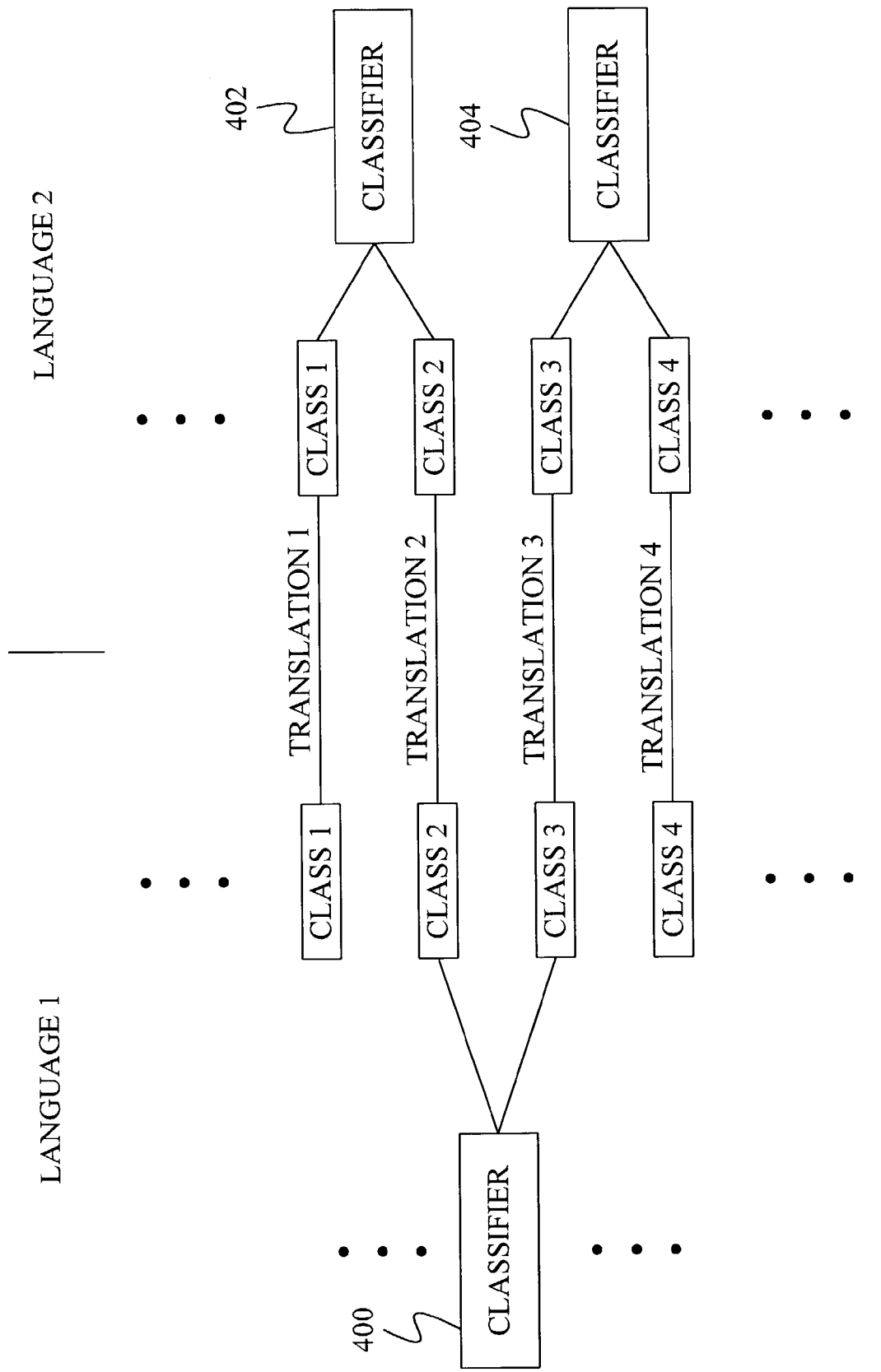
FIG. 4 is a diagram showing the relationship of classes to classifiers under an embodiment of the present invention.

The different sets of classes can be seen in FIG. 4. For example, classifier 400 of Language 1 classifies a word in Language 1 in either class 2 or class 3. However, in Language 2, there is no classifier that classifies words into these two classes. Instead, classifier 402 of Language 2 classifies a word into either class 1 or class 2, while classifier 404 of Language 2 classifies a word into either class 3 or class 4. Thus, the classifiers in the two languages do not operate on the same set of classes.

At step 500 of FIG. 5, an ambiguous word from the language is selected. For example, when building classifiers for the English language, an ambiguous English word would be selected and when building classifiers for the Chinese language, an ambiguous Chinese word would be selected at step 500.

At step 502, a translation dictionary 312 of FIG. 3 is consulted to identify the possible translations for the selected ambiguous word $\epsilon$ and one of these translations, $t_\epsilon$, is selected.

In step 504 of FIG. 5, the context length, which indicates the number of context words that will be used, is selected. Under one embodiment of the present invention, classifier probabilities produced for different context lengths are combined to generate a Naïve Bayesian Ensemble classifier as discussed further below.

Under one embodiment of the present invention, the classifier probabilities $p(t_\epsilon|s_\epsilon)$ and $p(\bar{t}_\epsilon|s_\epsilon)$ are calculated using Bayes' Rule such that:

$$p(t_\epsilon|s_\epsilon) = p(t_\epsilon)p(s_\epsilon|t_\epsilon) \quad \text{EQ. 7}$$

$$p(\bar{t}_\epsilon|s_\epsilon) = p(\bar{t}_\epsilon)p(s_\epsilon|\bar{t}_\epsilon) \quad \text{EQ. 8}$$

where $p(t_\epsilon)$ is the probability of translation $t_\epsilon$ across all contexts for $\epsilon$.

Similarly, for Chinese, the classifier probabilities are:

$$p(t_\gamma|s_\gamma) = p(t_\gamma)p(s_\gamma|t_\gamma) \quad \text{EQ. 9}$$

$$p(\bar{t}_\gamma|s_\gamma) = p(\bar{t}_\gamma)p(s_\gamma|\bar{t}_\gamma) \quad \text{EQ. 10}$$

where $p(t_\gamma)$ is the probability of transition $t_\gamma$ across all contexts for $\gamma$.

Under the present invention, the probabilities $p(s_\epsilon|t_\epsilon)$, $p(s_\epsilon|\bar{t}_\epsilon)$, $p(s_\gamma|t_\gamma)$ and $p(s_\gamma|\bar{t}_\gamma)$ are calculated as the product of individual probabilities for each word in the context such that:

$$p(s_\epsilon|t_\epsilon) = \prod_{i=1}^{m} p(e_{\epsilon,i}|t_\epsilon) \quad \text{EQ. 11}$$

$$p(s_\epsilon|\bar{t}_\epsilon) = \prod_{i=1}^{m} p(e_{\epsilon,i}|\bar{t}_\epsilon) \quad \text{EQ. 12}$$

$$p(s_\gamma|t_\gamma) = \prod_{i=1}^{m} p(c_{\gamma,i}|t_\gamma) \quad \text{EQ. 13}$$

$$p(s_\gamma|\bar{t}_\gamma) = \prod_{i=1}^{m} p(c_{\gamma,i}|\bar{t}_\gamma) \quad \text{EQ. 14}$$

Under one embodiment of the present invention, each word component of the context probability shown on the right side of Equations 11, 12, 13 and 14 is determined as a linear combination of a component estimated from the English labeled data, a component estimated from the Chinese labeled data, and a component determined from a uniform distribution of words in the language. Thus, each word component probability is defined as:

$$p(e_\epsilon|t_\epsilon) = (1-\alpha-\beta)p^{(E)}(e_\epsilon|t_\epsilon) + \alpha p^{(C)}(e_\epsilon|t_\epsilon) + \beta p^{(u)}(e_\epsilon) \quad \text{EQ. 15}$$

$$p(e_\epsilon|\bar{t}_\epsilon) = (1-\alpha-\beta)p^{(E)}(e_\epsilon|\bar{t}_\epsilon) + \alpha p^{(C)}(e_\epsilon|\bar{t}_\epsilon) + \beta p^{(u)}(e_\epsilon) \quad \text{EQ. 16}$$

$$p(c_\gamma|t_\gamma) = (1-\alpha-\beta)p^{(C)}(c_\gamma|t_\gamma) + \alpha p^{(E)}(c_\gamma|t_\gamma) + \beta p^{(u)}(c_\gamma) \quad \text{EQ. 17}$$

$$p(c_\gamma|\bar{t}_\gamma) = (1-\alpha-\beta)p^{(C)}(c_\gamma|\bar{t}_\gamma) + \alpha p^{(E)}(c_\gamma|\bar{t}_\gamma) + \beta p^{(u)}(c_\gamma) \quad \text{EQ. 18}$$

where the i subscript has been dropped from $e_{\epsilon,i}$ and $c_{\gamma,i}$ in favor of $e_\epsilon$ and $c_\gamma$ to simplify the expression, $0 \le \alpha \le 1$, $0 \le \beta \le 1$, $\alpha + \beta \le 1$, and in one embodiment $\alpha = 0.4$ and $\beta = 0.2$, and where $p^{(u)}(e_\epsilon)$ is a uniform probability distribution for each word in a set E of possible English words, $p^{(u)}(c_\gamma)$ is a uniform probability distribution for each word in the set C of possible Chinese words, $p^{(E)}(e_\epsilon|t_\epsilon)$ and $p^{(E)}(e_\epsilon|\bar{t}_\epsilon)$ are probability components that are determined from English labeled data 300 and are used to build English classifier 304, $p^{(C)}(e_\epsilon|t_\epsilon)$ and $p^{(C)}(e_\epsilon|\bar{t}_\epsilon)$ are probability components determined from Chinese labeled data 302 and are used to build English classifier 304, $p^{(C)}(c_\gamma|t_\gamma)$ and $p^{(C)}(c_\gamma|\bar{t}_\gamma)$ are probability components determined from Chinese labeled data 302 and are used to build Chinese classifier 306 and $p^{(E)}(c_\gamma|t_\gamma)$ and $p^{(E)}(c_\gamma|\bar{t}_\gamma)$ are probability components determined from English labeled data 300 and are used to build Chinese classifier 306.

In step 506, probability components $p^{(E)}(e_\epsilon|t_\epsilon)$ and $p^{(E)}(e_\epsilon|\bar{t}_\epsilon)$ are determined from the English labeled data while probability components $p^{(C)}(c_{65}|t_\gamma)$ and $p^{(C)}(c_\gamma|\bar{t}_\gamma)$ are determined from the Chinese labeled data. Under one embodiment, these probability components are determined using maximum likelihood estimation (MLE) on the respective labeled data sets. Such maximum likelihood estimation is well known in the art.

At step 508, the probability components $p^{(C)}(e_\epsilon|t_\epsilon)$ and $p^{(C)}(e_\epsilon|\bar{t}_\epsilon)$ are determined from the Chinese labeled data 302 and probability components $p^{(E)}(c_\gamma|t_\gamma)$ and $p^{(E)}(c_\gamma|\bar{t}_\gamma)$ are determined from the English labeled data 300. Under one embodiment, the system uses an Expectation Maximization algorithm (EM algorithm) that is based on finite mixture models of the form:

$$p(c|t_\epsilon) = \sum_{e_\epsilon \in E} p(c|e_\epsilon, t_\epsilon) p(e_\epsilon|t_\epsilon) \quad \text{EQ. 19}$$

$$p(c|\bar{t}_\epsilon) = \sum_{e_\epsilon \in E} p(c|e_\epsilon\bar{t}_\epsilon) p(e_\epsilon|\bar{t}_\epsilon) \quad \text{EQ. 20}$$

$$p(e|t_\gamma) = \sum_{c_\gamma \in C} p(e|c_\gamma, t_\gamma) p(c_\gamma|t_\gamma) \quad \text{EQ. 21}$$

$$p(e|\bar{t}_\gamma) = \sum_{c_\gamma \in C} p(e|c_\gamma, \bar{t}_\gamma) p(c_\gamma|\bar{t}_\gamma) \quad \text{EQ. 22}$$

and the assumption that the data in Chinese labeled data 302 and English labeled data 300 is independently generated from the model.

Before the EM training can begin, initial values for the probabilities $p(c|e_\epsilon, t_\epsilon)$, $p(c|e_\epsilon\bar{t}_\epsilon)$, $p(e|c_\gamma, t_\gamma)$, $p(e|c_\gamma, \bar{t}_\gamma)$, $p(e_\epsilon|t_\epsilon)$, $p(e_\epsilon|\bar{t}_\epsilon)$, $p(c_\gamma|t_\gamma)$ and $p(c_\gamma|\bar{t}_\gamma)$ must be determined. Under one embodiment of the invention, these values are initialized as:

$$p(c|e_\epsilon, t_\epsilon) = p(c|e_\epsilon, \bar{t}_\epsilon) = \begin{cases} \frac{1}{|C_e|}, & \text{if } c \in C_e \\ 0, & \text{if } c \notin C_e \end{cases} \quad \text{EQ. 23}$$

$$p(e|c_\gamma, t_\gamma) = p(e|c_\gamma, \bar{t}_\gamma) = \begin{cases} \frac{1}{|E_c|}, & \text{if } e \in E_c \\ 0, & \text{if } e \notin E_c \end{cases} \quad \text{EQ. 24}$$

$$p(e_\epsilon|t_\epsilon) = p(e_\epsilon|\bar{t}_\epsilon) = \frac{1}{|E|}, e_\epsilon \in E \quad \text{EQ. 25}$$

$$p(c_\gamma|t_\gamma) = p(c_\gamma|\bar{t}_\gamma) = \frac{1}{|C|}, c_\gamma \in C \quad \text{EQ. 26}$$

where $C_e$ represents all of the Chinese words that can be translated from the English context word $e_\epsilon$, $E_c$ represents all of the English words that can be translated from the Chinese context word $c_\gamma$, $|C_e|$ represents the number of Chinese words that can be translated from English word $e_\epsilon$, $|E_c|$ represents the number of English words that can be translated from Chinese word $c_\gamma$, $|E|$ represents the number of words in the English language, and $|C|$ represents the number of words in the Chinese language.

With these values initialized, the EM algorithm can be performed to determine the values of components $p(e_\epsilon|t_\epsilon)$, $p(e_\epsilon|\bar{t}_\epsilon)$, $p(c_\gamma|t_\gamma)$ and $p(c_\gamma|\bar{t}_\gamma)$. Specifically, to determine component $p(e_\epsilon|t_\epsilon)$ the following E step is performed:

$$p(e|c, t_\epsilon) \leftarrow \frac{p(c|e, t_\epsilon) p(e|t_\epsilon)}{\sum_{e \in E} p(c|e, t_\epsilon) p(e|t_\epsilon)} \quad \text{EQ. 27}$$

followed by an M step consisting of:

$$p(c|e, t_\epsilon) \leftarrow \frac{f(c, t_\epsilon) p(e|c, t_\epsilon)}{\sum_{c \in C} f(c, t_\epsilon) p(e|c, t_\epsilon)} \quad \text{EQ. 28}$$

$$p(e|t_\epsilon) \leftarrow \frac{\sum_{c \in C} f(c|t_\epsilon) p(e|c, t_\epsilon)}{\sum_{c \in C} f(c, t_\epsilon)} \quad \text{EQ. 29}$$

where c indicates a particular Chinese word, e indicates a particular English word, equation 27 is evaluated for all possible Chinese words c in the set of possible Chinese words C and equations 28 and 29 are evaluated for each English word e in the set of all possible English words E. The E step of equation 27 and the M step of equations 28 and EQ. 29 are repeated iteratively until the model becomes stable. Once stable, the value calculated in equation 29 for $p(e|t_\epsilon)$ is selected and is applied to equation 15 as term $p^{(C)}(e_\epsilon|t_\epsilon)$.

The probability $p^{(C)}(e_\epsilon|\bar{t}_\epsilon)$ of equation 16 is calculated using an E step of:

$$p(e|c, \bar{t}_\epsilon) \leftarrow \frac{p(c|e, \bar{t}_\epsilon) p(e|\bar{t}_\epsilon)}{\sum_{e \in E} p(c|e, \bar{t}_\epsilon) p(e|\bar{t}_\epsilon)} \quad \text{EQ. 30}$$

and an M step of $$p(c|e,\bar{t}_\varepsilon) \leftarrow \frac{f(c,\bar{t}_\varepsilon)p(e|c,\bar{t}_\varepsilon)}{\sum_{c\in C} f(c,\bar{t}_\varepsilon)p(e|c,\bar{t}_\varepsilon)} \quad \text{EQ. 31}$$

$$p(e|\bar{t}_\varepsilon) \leftarrow \frac{\sum_{c\in C} f(c,\bar{t}_\varepsilon)p(e|c,\bar{t}_\varepsilon)}{\sum_{c\in C} f(c,\bar{t}_\varepsilon)} \quad \text{EQ. 32}$$

which are iterated until a stable value of $p(e|\bar{t}_\varepsilon)$ is determined. This value is then used as $p^{(C)}(e_\varepsilon|\bar{t}_\varepsilon)$ in equation 16.

The probability $p^{(E)}(c_\gamma|t_\gamma)$ of equation 17 is determined using an E step of:

$$p(c|e,t_\gamma) \leftarrow \frac{p(e|c,t_\gamma)p(c|t_\gamma)}{\sum_{c\in C} p(e|c,t_\gamma)p(c|t_\gamma)} \quad \text{EQ. 33}$$

and an M step of:

$$p(e|c,t_\gamma) \leftarrow \frac{f(e,t_\gamma)p(c|e,t_\gamma)}{\sum_{e\in E} f(e,t_\gamma)p(c|e,t_\gamma)} \quad \text{EQ. 34}$$

$$p(c|t_\gamma) \leftarrow \frac{\sum_{e\in E} f(e,t_\gamma)p(c|e,t_\gamma)}{\sum_{e\in E} f(e,t_\gamma)} \quad \text{EQ. 35}$$

The E step and the M step are iterated until $p(c|t_\gamma)$ becomes stable at which point it is used as $p^{(E)}(c_\gamma|t_\gamma)$ in Equation 17.

Lastly, probability $p^{(E)}(c_\gamma|\bar{t}_\gamma)$ is calculated using an E step of:

$$p(c|e,\bar{t}_\gamma) \leftarrow \frac{p(e|c,\bar{t}_\gamma)p(c|\bar{t}_\gamma)}{\sum_{c\in C} p(e|c,\bar{t}_\gamma)p(c|\bar{t}_\gamma)} \quad \text{EQ. 36}$$

and an M step of:

$$p(e|c,\bar{t}_\gamma) \leftarrow \frac{f(e,\bar{t}_\gamma)p(c|e,\bar{t}_\gamma)}{\sum_{e\in E} f(e,\bar{t}_\gamma)p(c|e,\bar{t}_\gamma)} \quad \text{EQ. 37}$$

$$p(c|\bar{t}_y) \leftarrow \frac{\sum_{e\in E} f(e,\bar{t}_y)p(c|e,\bar{t}_y)}{\sum_{e\in E} f(e,\bar{t}_y)} \quad \text{EQ. 38}$$

The E step and the M step are iterated until $p(c|\bar{t}_\gamma)$ becomes stable at which point it is used as $p^{(E)}(c_\gamma|\bar{t}_\gamma)$ in equation 18.

After probability components $p^{(C)}(e_\varepsilon|t_\varepsilon)$, $p^{(C)}(e_\varepsilon|\bar{t}_\varepsilon)$, $p^{(E)}(c_\gamma|t_\gamma)$ and $p^{(E)}(c_\gamma|\bar{t}_\gamma)$ have been trained through the EM algorithm, their values are inserted into equations 15, 16, 17 and 18 to determine the probability values $p(e_\varepsilon|t_\varepsilon)$, $p(e_\varepsilon|\bar{t}_\varepsilon)$, $p(c_\gamma|t_\gamma)$ and $p(c_\gamma|\bar{t}_\gamma)$ at step 510. Thus, these components are linearly combined with the respective probability components $p^{(E)}(e_\varepsilon|t_\varepsilon)$, $p^{(E)}(e_\varepsilon|\bar{t}_\varepsilon)$, $p^{(C)}(c_\gamma|t_\gamma)$ and $p^{(C)}(c_\gamma|\bar{t}_\gamma)$ from the source language and the uniform probabilities.

At step 512, probability values $p(e_\varepsilon|t_\varepsilon)$, $p(e_\varepsilon|\bar{t}_\varepsilon)$, $p(c_\gamma|t_\gamma)$ and $p(c_\gamma|\bar{t}_\gamma)$ for each of the context words $e_{\varepsilon,i}$ and $c_{\gamma,i}$ are applied to equations 11-14 to produce context probabilities $p(s_\varepsilon|t_\varepsilon)$, $p(s_\varepsilon|\bar{t}_\varepsilon)$, $p(s_\gamma|t_\gamma)$ and $p(s_\gamma|\bar{t}_\gamma)$.

At step 514, the probabilities $p(t_\varepsilon)$, $p(\bar{t}_\varepsilon)$, $p(t_\gamma)$ and $p(\bar{t}_\gamma)$ are determined using maximum likelihood estimation. In particular, $p(t_\varepsilon)$ and $p(\bar{t}_\varepsilon)$ are determined using English labeled data 300 and $p(t_\gamma)$ and $p(\bar{t}_\gamma)$ are determined using Chinese labeled data 302.

At step 516, equations 7, 8, 9 and 10 are used to determine classifier probabilities $p(t_\varepsilon|s_\varepsilon)$, $p(\bar{t}_\varepsilon|s_\varepsilon)$, $p(t_\gamma|s_\gamma)$ and $p(\bar{t}_\gamma|s_\gamma)$ using the context probabilities $p(s_\varepsilon|t_\varepsilon)$, $p(s_\varepsilon|\bar{t}_\varepsilon)$, $p(s_\gamma|t_\gamma)$ and $p(s_\gamma|\bar{t}_\gamma)$ from equations 11-14 and the translation probabilities $p(t_\varepsilon)$, $p(\bar{t}_\varepsilon)$, $p(t_\gamma)$ and $p(\bar{t}_\gamma)$. For embodiments that use a Naive Bayesian Ensemble classifier, the classifier probabilities determined for this context length are added to a running average as:

$$p(t_\varepsilon|s_\varepsilon)_{avg.} = p'(t_\varepsilon|s_\varepsilon)_{avg.} + \frac{1}{h} p(t_\varepsilon|s_{\varepsilon:i}) \quad \text{EQ. 39}$$

$$p(\bar{t}_\varepsilon|s_\varepsilon)_{avg.} = p'(\bar{t}_\varepsilon|s_\varepsilon)_{avg.} + \frac{1}{h} p(\bar{t}_\varepsilon|s_{\varepsilon:i}) \quad \text{EQ. 40}$$

$$p(t_\gamma|s_\gamma)_{avg.} = p'(t_\gamma|s_\gamma)_{avg.} + \frac{1}{h} p(t_\gamma|s_{\gamma:i}) \quad \text{EQ. 41}$$

$$p(\bar{t}_\gamma|s_\gamma)_{avg.} = p'(\bar{t}_\gamma|s_\gamma)_{avg.} + \frac{1}{h} p(t_\gamma|s_{\gamma:i}) \quad \text{EQ. 42}$$

where h is the number of different context lengths, $p(t_\varepsilon|s_{\varepsilon:i})$, $p(\bar{t}_\varepsilon|s_{\varepsilon:i})$, $p(t_\gamma|s_{\gamma:i})$ and $p(\bar{t}_\gamma|s_{\gamma:i})$ are the classifier probabilities determined for the current context length, probabilities $p'(t_\varepsilon|s_\varepsilon)_{avg.}$, $p'(\bar{t}_\varepsilon|s_\varepsilon)_{avg.}$, $p'(t_\gamma|s_\gamma)_{avg.}$ and $p'(\bar{t}_\gamma|s_\gamma)_{avg.}$ are the previous values of the running averages for the classifier probabilities and probabilities $p(t_\varepsilon|s_\varepsilon)_{avg.}$, $p(\bar{t}_\varepsilon|s_\varepsilon)_{avg.}$, $p'(t_\gamma|s_\gamma)_{avg.}$ and $p(\bar{t}_\gamma|s_\gamma)_{avg.}$ are the updated running averages of the classifier probabilities. The last calculated values of the running averages are used as the classifier probabilities $p(t_\varepsilon|s_\varepsilon)$, $p(\bar{t}_\varepsilon|s_\varepsilon)$, $p(t_\gamma|s_\gamma)$ and $p(\bar{t}_\gamma|s_\gamma)$.

At step 518, the method determines if there are more context lengths to be considered. If there are more context lengths, the next context length is selected at step 504 and the steps between step 504 and step 518 are repeated for the new context length.

When there are no more context lengths at step 518, the method determines if there are more translations for the ambiguous word at step 520. If there are more translations available, the next translation is selected at step 502 and steps 504, 506, 508, 510, 512, 514, 516, and 518 are repeated for the new translation. When there are no more translations at step 520, the process continues at step 522 where it determines if there are more ambiguous words in the language. If there are more ambiguous words, the next ambiguous word is selected at step 500 and the steps between steps 500 and 522 are repeated for the newly selected word.

When there are no more ambiguous words at step 522, the training of the classifiers is complete.

Once the classifiers have been trained at steps 202 and 204 of FIG. 2, English unlabeled data 314 is labeled using English classifiers 304 at step 206. Similarly, Chinese unlabeled data 316 is labeled using Chinese classifiers 306 at step 208.

FIG. 6 provides a flow diagram that shows the process of steps 206 and 208 in detail. The steps of FIG. 6 are performed in parallel by English classifier 304 and Chinese classifier 306 as indicated by FIG. 2.

At step 600, an ambiguous word is selected. The unlabeled data 314, 316 is then examined to find an instance of the word and its surrounding context at step 602. The context length of the context matches the longest context length used to train the classifiers.

At step 604, respective classifiers 304 and 306 are used to identify a best translation t for the instance of the word and the context. Under one embodiment, this is done by calculating a score for each translation and selecting the translation with the maximum score. For English, the score is calculated as:

$$\lambda(s_\varepsilon) = \max_{t_\varepsilon \in T_\varepsilon} \frac{p(t_\varepsilon | s_\varepsilon)}{p(\bar{t}_\varepsilon | s_\varepsilon)} \quad \text{EQ. 43}$$

and for Chinese this score is calculated as:

$$\lambda(s_\gamma) = \max_{t_\gamma \in T_\gamma} \frac{p(t_\gamma | s_\gamma)}{p(\bar{t}_\gamma | s_\gamma)} \quad \text{EQ. 44}$$

At step 606, the score selected from equation 43 or equation 44 at step 604 is stored along with the instance $s_\varepsilon$, $s_\gamma$ in a list for the translation that maximized the score in equation 43 or equation 44.

At step 608, the method determines if there are more instances of the ambiguous word selected at step 600. If there are more instances, the next instance is selected at step 602 and steps 604 and 606 are repeated for the new instance. When there are no further instances at step 608, the process continues at step 610 where the instances in each translation's list are ordered by the scores for the instance and the best scoring instances in each translation list are selected to be added to the labeled data such as English labeled data 300 or Chinese labeled data 302. The number of instances that are added to the labeled data is a matter of design choice.

At step 612, the method determines if there are more ambiguous words. If there are more ambiguous words, the next ambiguous word is selected at step 600 and steps 602, 604, 606, 608 and 610 are repeated for the new word. When there are no further ambiguous words at step 612, the labeling process is complete at step 614.

After the method of FIG. 6 is performed at steps 206 and 208 respectively, the method of FIG. 2 continues at step 210 where the updated labeled data sets are exchanged between English trainer 308 and Chinese trainer 310. This makes the updated labeled data available to the trainers and the process of FIG. 2 returns to steps 202 and 204 to retrain the classifiers based on the updated labeled data. The steps of training the classifiers, using the classifiers to label unlabeled data, and exchanging the labeled data sets are repeated until there is no further data to be labeled.

By using the labeled data sets in two different languages to train a classifier in a single language, the present invention improves the final classifier that is produced while still limiting the amount of hand-labeled data that is required to form the classifiers. Note that although a general algorithm has been provided that can be used to generate classifiers for any number of ambiguous words in both English and Chinese, in some embodiments, classifiers are built only for a selected set of words in one or both languages.

Although the present invention has been described with reference to particular embodiments, workers skilled in the art will recognize that changes may be made in form and detail without departing from the spirit and scope of the invention.

What is claimed is:

1. A method of training a classifier, the method comprising:
   applying a first classifier to a first set of unlabeled data to form a first set of labeled data, the first classifier capable of assigning data to classes in a first set of classes;
   applying a second classifier to a second set of unlabeled data to form a second set of labeled data, the second classifier capable of assigning data to classes in a second set of classes that is different from the first set of classes; and
   using the first set of labeled data and the second set of labeled data to retrain the first classifier to form a retrained classifier that can be used to assign data to classes, retraining comprising:
   determining a first probability component from the first set of labeled data;
   determining a second probability component from the second set of labeled data; and
   combining the first probability component and the second probability component to form a probability term used to define the first classifier.

2. The method of claim 1 wherein the first set of unlabeled data comprises text in a first language and the second set of unlabeled data comprises text in a second language.

3. The method of claim 2 wherein the first set of classes comprises senses for a word in the first language.

4. The method of claim 3 wherein the second set of classes comprises senses for a word in the second language.

5. The method of claim 1 wherein determining the first probability component comprises executing a first algorithm using the first set of labeled data and wherein determining the second probability component comprises executing a second algorithm that operates differently from the first algorithm using the second set of labeled data.

6. The method of claim 5 wherein the first algorithm comprises a maximum likelihood estimation algorithm.

7. The method of claim 6 wherein the second algorithm comprises an expectation maximization algorithm.

8. The method of claim 1 wherein combining the first probability component and the second probability component comprises linearly combining the first probability component and the second probability component.

9. The method of claim 1 further comprising using the first set of labeled data and the second set of labeled data to retrain the second classifier to form a second retrained classifier.

10. The method of claim 9 wherein using the first set of labeled data to retrain the first classifier comprises executing a first algorithm on the first set of labeled data and wherein using the first set of labeled data to retrain the second classifier comprises executing a second algorithm on the first set of labeled data, where the second algorithm operates differently than the first algorithm.

11. The method of claim 10 wherein the first algorithm comprises a maximum likelihood estimation algorithm.

12. The method of claim 11 wherein the second algorithm comprises an expectation maximization algorithm.

13. The method of claim 9 further comprising:
applying the retrained classifier to a set of unlabeled data to form a first additional set of labeled data;
applying the second retrained classifier to a set of unlabeled data to form a second additional set of labeled data; and
using the first additional set of labeled data and the second additional set of labeled data to retrain the retrained classifier.

14. A computer-readable storage medium storing computer-executable instructions for performing steps comprising:
generating first language labeled data that indicates a sense of at least one word in a first language;
generating second language labeled data that indicates a sense of at least one word in a second language; and
using the first language labeled data and the second language labeled data to train a classifier for the first language, where the classifier can be used to identify a sense of a word in the first language, wherein using the first language labeled data and the second language labeled data to train a classifier comprises:
determining a first probability component comprising a probability using the first language labeled data;
determining a second probability component comprising a probability using the second language labeled data; and
combining the first probability component and the second probability component to form a probability term for the classifier.

15. The computer-readable medium of claim 14 wherein generating first language labeled data comprises applying unlabeled data in the first language to a classifier for the first language.

16. The computer-readable storage medium of claim 15 wherein training a classifier for the first language comprises retraining the classifier used to generate the first language labeled data.

17. The computer-readable storage medium of claim 15 wherein generating second language labeled data comprises applying unlabeled data in the second language to a classifier for the second language.

18. The computer-readable storage of claim 14 wherein combining the first probability component and the second probability component comprises linearly combining the first probability component and the second probability component.

19. The computer-readable storage medium of claim 14 wherein determining the first probability component comprises using a first algorithm and wherein determining the second probability component comprises using a second algorithm that is different from the first algorithm.

20. The computer-readable storage medium of claim 19 wherein the first algorithm is a maximum likelihood estimation algorithm.

21. The computer-readable storage medium of claim 20 wherein the second algorithm is an expectation maximization algorithm.

22. The computer-readable storage medium of claim 14 further comprising using the classifier trained from the first language labeled data and the second language labeled data to classify unlabeled data in the first language to form additional first language labeled data.

23. The computer-readable storage medium of claim 14 further comprising using the first language labeled data and the second language labeled data to train a classifier for the second language.

24. The computer readable storage medium of claim 23 wherein using the first language labeled data and the second language labeled data to train a classifier for the second language comprises:
determining a first probability component using the first language labeled data;
determining a second probability component using the second language labeled data; and
combining the first probability component and the second probability component to form a probability term for the classifier for the second language.

25. The computer-readable storage medium of claim 24 wherein combining the first probability component and the second probability component comprises linearly combining the first probability component and the second probability component.

26. The computer-readable storage medium of claim 24 wherein determining the first probability component comprises using a first algorithm and wherein determining the second probability component comprises using a second algorithm that is different from the first algorithm.

27. The computer-readable storage medium of claim 26 wherein the second algorithm is a maximum likelihood estimation algorithm.

28. The computer-readable storage medium of claim 27 wherein the first algorithm is an expectation maximization algorithm.

29. The computer-readable storage medium of claim 23 further comprising using the classifier for the second language to classify unlabeled data in the second language to form additional second language labeled data.

* * * * *

UNITED STATES PATENT AND TRADEMARK OFFICE
CERTIFICATE OF CORRECTION

PATENT NO. : 7,318,022 B2  
APPLICATION NO. : 10/459816  
DATED : January 8, 2008  
INVENTOR(S) : Hang Li Page 1 of 1

It is certified that error appears in the above-identified patent and that said Letters Patent is hereby corrected as shown below:

In column 13, line 31, in Claim 15, before "medium" insert -- storage --.

In column 13, line 43, in Claim 18, before "of" insert -- medium --.

Signed and Sealed this

First Day of February, 2011

David J. Kappos  
*Director of the United States Patent and Trademark Office*